United States Patent [19]

Carbonaro et al.

[11] Patent Number: 4,525,549
[45] Date of Patent: Jun. 25, 1985

[54] PROCESS FOR PREPARING CONJUGATE DIOLEFINS, AND MEANS SUITABLE FOR THIS PURPOSE

[75] Inventors: Antonio Carbonaro, Milan; Domenico Ferraro, S. Donato Milanese, both of Italy

[73] Assignee: Enoxy Chimica S.p.A., Milan, Italy

[21] Appl. No.: 484,956

[22] Filed: Apr. 14, 1983

[30] Foreign Application Priority Data

Apr. 15, 1982 [IT] Italy ............................. 20746 A/82

[51] Int. Cl.$^3$ ................................................ C08F 5/52
[52] U.S. Cl. ......................................... 526/92; 526/98; 526/100; 526/137; 526/138; 526/142; 252/429 R; 252/429 B; 252/430
[58] Field of Search ............... 526/92, 98, 100, 137, 526/138, 142, 111; 252/429 R, 429 B, 430

[56] References Cited

U.S. PATENT DOCUMENTS

| | | |
|---|---|---|
| 3,803,053 | 4/1974 | Yoo ............................... 252/429 B |
| 4,242,232 | 12/1980 | Sylvester ........................... 526/137 |
| 4,299,937 | 11/1981 | Columberg ........................ 526/142 |
| 4,384,982 | 5/1983 | Martin ............................. 252/429 B |

*Primary Examiner*—Paul R. Michl
*Attorney, Agent, or Firm*—Hedman, Gibson, Costigan & Hoare

[57] ABSTRACT

A new process is described for polymerizing and copolymerizing conjugate diolefins characterized by the use of a catalytic system comprising at least one compound of Group III B of the periodic system, at least one non-halogenated aluminium alkyl, at least one compound containing one or more hydroxyls of acid or neutral type, and possibly an inorganic compound containing Cl or Br in ionizable form or an organic halogen derivative.

The new process allows the preparation, both in the absence and in the presence of an inert diluent, of polydiolefins of essentially entirely 1,4-cis structure which even in the absence of a purification stage contain a very small quantity of catalytic residues.

14 Claims, No Drawings

PROCESS FOR PREPARING CONJUGATE DIOLEFINS, AND MEANS SUITABLE FOR THIS PURPOSE

The polymerisation of conjugate diolefins by means of catalysts based on the use of compounds pertaining to Group III B of the periodic system of elements has numerous references in the literature. It is effected by bringing the monomer into contact with one of said compounds, with an organo-metallic aluminium compound, and with a halogenated compound. This method produces polymers which are predominantly of 1,4-cis structure.

Generally, the preparation of the catalyst is determined by the choice of the transition metal compound or by the manner in which it is reacted with the other components of the catalytic system. Thus, the patents U.S. No. 3,297,667, I 888,958, and Be 859,438 emphasise he need to use a hydrocarbon-soluble chelate compound in which at least one substituent bonded to the transition metal is a bidentate or monodentate ligand.

On the other hand the patent applications DOS 2,830,080 and 2,848,964 claim the need for a prior reaction between a carboxylate of a metal of the lanthanide group and a part of the aluminium trialkyl used as the other component, in order that the solution is catalytically active.

In spite of the aforesaid requirements, the said systems are unable to offer a sufficiently high activity to allow processes to be effected in which the washing of the final polymer is dispensed with, in relation to its low inorganic residue content (eg. $Nd < 100$ ppm). This could perhaps be effected, but with a reaction time which would be so long as to be industrially inacceptable.

Not even the use of a phosphorus compound as the fourth catalytic component, as described in U.S. Pat. No. 3,641,188, is effective for preparing high molecular weight polydienes having a high content of 1,4-cis units with a sufficiently high level of activity.

We have now found that it is possible to attain said objectives, and also obtain numerous other advantages, by reacting conjugate diolefins under the conditions specified hereinafter, with a catalytic system prepared from:

(a) at least one compound of a metal of Group III B of the periodic system;
(b) at least one aluminium compound of formula $AlR_2R'$, where R is alkyl, cycloalkyl or alkylaryl, and R' is R or H;
(c) at least one compound containing one or more hydroxyls such as water, carboxylic alcohols or carboxylic acids; and possibly
(d) at least one inorganic compound containing Cl or Br in ionizable form or at least one organic halogen derivative of formula

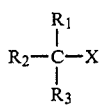

in which $R_1$, $R_2$ and $R_3$, which can be either different from each other or entirely or partly equal to each other, are H, O, Cl or Br atoms, or alkyl, aryl, alkylaryl, chloro or bromo alkyl, alkoxy or cycloalkoxy, and X is Cl or Br.

The use of compounds such as those indicated under (c) in association with extremely reactive organo-metallic compounds such as those of aluminium (component b) is surprising because in analogous processes it is considered vital for the monomer and diluent to be carefully purified of all reactive impurities, and in particular for them to be dried in order to remove the water dissolved in them.

Water, carboxylic acids and carboxylic alcohols are habitually used for deactivating the catalyst, thus interrupting any polymer reaction (see for example the said DOS 2,830,080 and 2,848,964).

Even more surprising is the fact that said polar compounds, instead of behaving as poisons, act as true catalytic components to the extent of making the presence of the halogenated component d not strictly vital for the preparation of the catalyst.

This fact, ie the formation of a catalyst active in the polymerization of diolefins even in the total absence of halogens, has not previously been described in any scientific or patent literature. However, only the synergic action determined by the simultaneous presence of catalytic components c and d makes it possible to effect the process in accordance with the objects of the present invention, even though the quantity of d can be reduced to a very low value compared with that known from previous teachings.

The numerous practical advantages which can be obtained include the elimination of the drying stage for the diluent and/or monomer, and the high catalyst activity in terms of consumption of catalytic system per unit weight of polymer.

A further important advantage is the possibility, particularly when operating in the absence of diluents, of entirely dispensing with the aqueous washing of the polymer solution and the polymer drying which seriously affect the economics of certain industrial processes, while at the same time obtaining a final product with a low content of those catalytic residues which can have an adverse effect on the product properties.

In this respect it is possible with the present teaching for the content of for example neodymium in a cis-polybutadiene in the absence of a purification stage to be less than 100 ppm even after one hour of polymerization and for said content to fall to previously unforseeable values, for example below 20 ppm by adequately prolonging the reaction time and thus the overall monomer conversion.

A further advantage is the obvious one of a more simple and more economical choice of catalytic components.

In this respect, it is no longer necessary according to the present teaching to use special hydrocarbon-soluble transition metal compounds of laborious preparation and/or limited stability. It is sufficient to use simple stable compounds such as their oxides, and associate them with a hydrohalogen acid, with an aluminium alkyl and with an alcohol, or an organic acid or water, in order to obtain a catalyst able to polymerise conjugate diolefins into linear products of high molecular weight and with a high stereo-regularity of 1,4-cis type. Such catalytic compounds are new and are not encountered in the prior art. For example Nd oxide is immediately available commercially, as is HCl, so combining low cost with high reactivity. In addition, hydrohalogen acids in aqueous solution already correspond to the association of two of the four catalytic components.

In preparing the catalyst in accordance with the process of the present invention, the reaction between the three or four aforesaid components is effected under the following molar proportions: component b/component a greater than 20 and preferably between 30 and 200; component c/component a greater than 2 and preferably between 4 and 100; component d/component a equal to or greater than 0 and preferably between 0.2 and 3.

The order in which the catalytic components are reacted with each other and with the monomer or monomers does not affect the progress of polymerization.

As there are numerous possible combinations between at least three or four reagents, each of which pertains to one of the said classes, it is not possible to specify the optimum reaction conditions case by case. Generally, it is preferable to prepare the catalyst at ambient temperature in concentrated solution, and then to dilute it with the monomer.

Water, which is poorly soluble in aliphatic hydrocarbons, is fairly soluble in diolefins in the liquid state and can therefore be introduced in this way. We have however surprisingly found that even water dispersed as droplets in a hydrocarbon medium performs its cocatalytic action, and that the least favourable condition for preparing the catalyst is to bring the transition metal compound directly into contact with water.

The use of solutions or aqueous complexes of catalytic components c and d (thus including carboxylic alcohols and acids) is one of the most advantageous and particularly innovative cases of the invention. The use of an inert diluent is not strictly necessary, and it is possible to control the polymerisation even in the complete absence thereof. If it is preferred to use the diluent, it can be a hydrocarbon solvent, preferably aliphatic or cycloaliphatic.

The polymerization temperature is not critical, and can therefore be chosen within a very wide range extending for example from 0° C. to 200° C. and beyond. It does not substantially influence the characteristics of the polymer, apart from its mean molecular weight and its molecular weight distribution.

The monomer can be completely converted into polymer in the absence of diluents.

Further advantages are that the temperature is not critical, and that even when operating in bulk, conjugate diolefin polymers are obtained which have a high content of 1,4-cis units together with controlled molecular weights and a linear structure, such as to make them perfectly soluble in even aliphatic hydrocarbons and in the monomers themselves in the liquid state.

The technological, mechanical and elastic properties of the polymer products are excellent even after curing, the content of 1,4-cis units being always very high and, by virtue of component c, being adjustable within the range of between 90% and more than 98%. This latter fact constitutes a further advantage of the invention over the known art. The melting point of polybutadiene is particularly high, namely between +3 and +7° C. (measured at the peak of the DSC spectrum).

Monomers which can be polymerised by the process herein described comprise all conjugate diolefins, and particularly 1,3-butadiene, 1,3-pentadiene and isoprene.

Copolymers of two or more of the said monomers are interesting because of their microstructure which is essentially entirely of 1,4-cis type, and because of the statistical distribution of the monomer units. The polymer does not require a purification stage to remove the deactivated catalytic residues, because of their small quantity and their substantial inertia.

All operating details will be apparent from reading the following examples, the purpose of which is merely to illustrate the invention without limiting its scope.

EXAMPLE 1

3.0 ml of a solution of:

| | |
|---|---|
| $Nd(OC_4H_9)_3$ | 0.028 mmoles |
| $Al(i.C_4H_9)_2H$ | 1.4 mmoles |
| $Al(C_2H_5)Cl_2$ | 0.042 mmoles | in hexane are placed in a drink bottle of about 1000 ml capacity. After inserting a magnetically driven metal anchor for agitating the solution, the bottle is closed with a crown cap fitted with a rubber gasket. 93 g of butadiene containing 13.9 mg (0.77 mmoles) of dissolved $H_2O$ are fed by means of a cylinder fitted with a hypedermic needle, by way of a bore formed in the cap.

The bottle is placed in a bath temperature-controlled at 30° C., and its contents are agitated for one hour. After siphoning-off the excess of monomer, the polymer is dried under vacuum and weighed, to give 59.1 g equal to a conversion of 63.5%. Yield: 14540 g of polymer per g of Nd (residual Nd 68 ppm).

Infrared analysis indicates the following composition: 1,4-cis butadiene units 98.1%, 1,4-trans butadiene units 1.2%, 1,2 butadiene units 0.7%.

The polymer shows a Mooney viscosity (100°, 1+4) of 52 and a melting point (DSC) of +3° C.

EXAMPLE 2

Operating as described in Example 1, 2.1 ml of a solution of:

| | |
|---|---|
| Nd trinaphthenate | 0.028 mmoles |
| $Al(i.C_4H_9)_2H$ | 1.4 mmoles |
| $Al(C_2H_5)Cl_2$ | 0.021 mmoles | in hexane are placed in the bottle.

After the bottle is capped, 93 g of butadiene containing 7.1 mg (0.39 mmoles) of dissolved $H_2O$ are added.

After 60 minutes of polymerization at 30°, 33 g of dry polymer are recovered having a ML (1+4, 100° C.) of 21.5, Tm (DSC) of 4° C., and a 1,4-cis content (IR) of 98.5%.

EXAMPLE 3

Vacuum is applied to a steel autoclave of capacity 2 liters fitted with a magnetically driven anchor agitator and a temperature regulator, and 33 ml of a suspension in hexane prepared by reacting the following in the stated order:

| | |
|---|---|
| $Nd_2O_3$ | 0.1875 mmoles |
| HCl | 0.75 mmoles |
| $n.C_4H_9OH$ | 11.25 mmoles |
| $Al(i.C_4H_9)_2H$ | 18.75 mmoles |
| $H_2O$ | 3.8 mmoles | are introduced by suction.

The molar ratios are therefore: Cl/Nd=2, Al/Nd=50, "OH"/Nd=40.

After introducing 500 g of butadiene, the autoclave is temperature-controlled at 50° C.

The reaction mixture is agitated for one hour at 50° C.

A product weighing 220 g after drying under vacuum is discharged from the autoclave. It is a polybutadiene of 98% 1,4-cis structure (IR analysis) and with a Mooney viscosity (1+4, 100° C.) of 65.

EXAMPLE 4

The test described in Example 3 is repeated, but with the following modifications:

| | |
|---|---|
| n.C$_4$H$_9$OH | 3.75 mmoles (instead of 11.25) |
| HCl | 0.37 mmoles (instead of 0.75) |

Under the same reaction conditions as described therein, 180 g of polybutadiene are obtained having a Mooney viscosity of 41.5 (1+4, 100°) and a content of 1,4-cis units of 99.1%.

EXAMPLE 5

Operating as described in Example 1, 2.9 ml of a suspension in hexane of:

| | |
|---|---|
| Nd$_2$O$_3$ | 0.018 mmoles |
| HCl | 0.036 mmoles |
| Naphthenic acids (acidity index 230) | 0.36 mmoles |
| Al(i.C$_4$H$_9$)$_2$H | 1.81 mmoles |
| (Cl/Nd = 1, Al/Nd = 50, "OH"/Nd = 10) | | are placed in the bottle.

30 g of anhydrous butadiene are then fed through the cap. The reacting mass is kept under agitation at 30° for two hours, and is then discharged from the bottle and dried under vacuum. 10.1 g of solid polymer are obtained having the following characteristics:

98.5% of 1,4-cis butadiene units (IR analysis), [θ] 3.6 dl/g (toluene, 30°).

EXAMPLE 6

2 ml of a solution of:

| | |
|---|---|
| Nd$_2$O$_3$ | 0.022 mmoles |
| n.C$_4$H$_9$OH | 1.35 mmoles |
| HCl = H$_2$O (37% soln.) | 0.88 mg |
| Al(i.Bu)$_2$H | 2.20 mmoles |
| (Cl/Nd = 0.2, Al/Nd = 50, "OH"/Nd = 35) | | in hexane are placed in a 200 ml glass bottle operating as described in Example 1.

30 g of anhydrous butadiene are then added.

The bottle is kept agitated in a water bath temperature-controlled at 30° C. for five hours. The polymer formed weighs 16.8 g after drying. Its cis content is 97.2%.

EXAMPLE 7

A butadiene polymerization test in the complete absence of halogenated compounds (component c) is carried out in a 200 ml glass bottle operating as described in Example 1, the catalyst being prepared from:

| | |
|---|---|
| Nd trinaphthenate | 0.022 mmoles |
| Al(i.Bu)$_3$ | 1.125 mmoles |

The reaction takes place in the presence of 1 ml of hexane as diluent. 30 g of butadiene in which H$_2$O is dissolved to the extent of 100 ppm are added to said solution.

The bottle is capped and agitated in a water bath at 30° for eight hours. On drying the polymer solution under vacuum, 3.9 g of dry polymer are obtained having a [η] of 3.8 (measured in toluene at 30°) and a content of 1,4-cis-pentadiene units of 98.1%.

EXAMPLE 8

The test is repeated operating as described in Example 7 and using the same reagents in the same quantities, the only difference being that anhydrous butadiene is used instead of the butadiene containing 100 ppm of H$_2$O. Not even a trace of polymer was obtained under the reaction conditions of Example 7.

EXAMPLE 9

130 ml of hexane containing 18.5 g of dissolved butadiene and H$_2$O are fed under a N$_2$ atmosphere into a glass bottle of capacity 200 ml. 2.3 ml of a solution of:

| | |
|---|---|
| Nd(OC$_4$H$_9$)$_3$ | 0.032 mmoles |
| Al(i.C$_4$H$_9$)$_2$H | 1.55 mmoles |
| Al(C$_2$H$_5$)Cl$_2$ | 0.024 mmoles | in hexane are then added.

The capped bottle is placed in a water bath at 50° C. and kept agitated for one hour. On pouring the reaction solution into 200 ml of ethanol and drying, 17 g of solid polymer are obtained.

EXAMPLE 10

The following are reacted together in the reactor and under the conditions described in Example 1:

2.4 ml of a solution of 0.028 mmoles of Nd(OC$_4$H$_9$)$_3$, 1.4 mmoles of Al(i.C$_4$H$_9$)$_3$ and 0.01 mmoles of Al(C$_2$H$_5$)Cl$_2$ in hexane; 93 g of butadiene containing 18 mg of dissolved H$_2$O.

After 120 minutes of reaction at 30° under agitation, followed by drying, 54 g of 1,4-cis polybutadiene (IR analysis: 98.9%) are obtained corresponding to a yield of 13,400 g per g of Nd.

EXAMPLE 11

120 ml of hexane and 16 ml of H$_2$O are fed under a N$_2$ atmosphere into a glass bottle of capacity 200 ml. 3.1 ml of a solution in hexane prepared by reacting:

| | |
|---|---|
| Nd$_2$O$_3$ | 0.016 mmoles |
| H$_2$O | 1.1 mmoles |
| Naphthenic acids | 0.064 mmoles |
| are added, followed by: | |
| Al(i.Bu)$_2$H | 1.6 mmoles |
| | (0.085 M solution in hexane) |
| AlEtCl$_2$ | 0.032 mmoles |
| | (0.444 M solution in hexane) |
| Finally, 18.5 g of anhydrous butadiene are introduced. | |

After two hours of agitation at 50° C., the polymer solution is poured from the bottle into ethyl alcohol to give 18.5 g of product after drying. IR analysis indicates a 94% content of 1,4-cis units. [η] 1.4 dl/g (toluene, 30° C.).

We claim:

1. A catalytic system for polymerizing or copolymerizing conjugate diolefins prepared from:

(a) at least one compound of a metal of Group III B of the periodic system;
(b) at least one aluminium compound of formula AlR R', where r is alkyl, cycloalkyl or alkylaryl, and R' is R or H;
(c) water and optionally
(d) an inorganic compound containing Cl or Br in ionizable form, or at least one organic halogen derivative of formula:

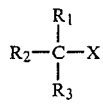

where $R_1$, $R_2$ and $R_3$, which can be either different from each other or entirely or partly equal to each other, are H, O, Cl or Br atoms, or alkyl, aryl, alkylaryl, chloro or bromo alkyl, alkoxy or cycloalkoxy residues, and X is Cl or Br.

2. A catalytic system as claimed in claim 1, characterized in that component (a) is preferably an oxide.

3. A catalytic system as claimed in claim 2, characterized in that component (a) is chosen from neodymium, praseodymium and cerium.

4. A catalytic system as claimed in claim 1, characterized in that component (d) is HCl or HBr.

5. A catalytic system as claimed in claim 4, characterized in that HCl or HBr is in aqueous solution.

6. A catalytic system as claimed in claim 5, characterized in that the molar ratio of component (b) to component (a) is greater than 20.

7. A catalytic system as claimed in claim 6, characterized in that the molar ratio of component (b) to component (a) is preferably between 30 and 200.

8. A catalytic system as claimed in claim 1, characterized in that the molar ratio of component (c) to component (a) is greater than 2.

9. A catalytic system as claimed in claim 8, characterized in that the molar ratio of component (c) to component (a) is between 4 and 100.

10. A catalytic system as claimed in claim 9, characterized in that the molar ratio of component (d) to component (a) is equal to or greater than 0.

11. A catalytic system as claimed in claim 10, characterized in that the molar ratio of component (d) to component (a) is between 0.2 and 3.

12. A process for polymerizing and copolymerizing conjugate diolefins, said process comprising carrying out the reaction in the presence of the catalytic system as claimed in claim 1.

13. A process as claimed in claim 12, characterized in that the conjugate diolefin is chosen from butadiene, isoprene and piperylene.

14. A catalytic system as claimed in claim 1 wherein component (d) is at least one organic halogen derivative of the formula

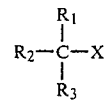

wherein $R_1$, $R_2$ and $R_3$ which can be either different from each other, are H, O, Cl or Br atoms or alkyl, aryl, alkyaryl, chloro or bromo alkyl, alkoxy or cycloalkoxy residues and X is Cl or Br.

* * * * *